Jan. 14, 1930.   E. W. CHAFEE ET AL   1,743,189
ELECTRICAL TRANSMISSION SYSTEM
Filed Dec. 20, 1926    2 Sheets-Sheet 2

INVENTORS
Earl W. Chafee
Frederick C. Narvesen
BY
Herbert H. Thompson
ATTORNEY.

Patented Jan. 14, 1930

1,743,189

UNITED STATES PATENT OFFICE

EARL W. CHAFEE, OF BROOKLYN, AND FREDERICK C. NARVESEN, OF EAST ROCKAWAY, NEW YORK, ASSIGNORS, BY MESNE ASSIGNMENTS, TO SPERRY GYROSCOPE COMPANY, INC., OF BROOKLYN, NEW YORK, A CORPORATION OF NEW YORK

ELECTRICAL TRANSMISSION SYSTEM

Application filed December 20, 1926. Serial No. 155,991.

This invention relates to transmission mechanisms and more particularly to step-by-step or impulse transmission systems. It is desirable in such systems to transmit as many steps as possible per revolution, for thereby the movements of the receiver are made uniform and sensitive, that is, it moves through a very small angle per step, and also a greater speed of the repeater motor is made possible without danger of losing synchronism with the transmitter. Our invention, therefore, employs a repeater motor having six field poles, in which respect it may be similar to the motors shown in the patent to E. Meitner, #1,391,652, granted September 20, 1921. As set forth in said patent it is possible by employing a two-pole armature and a six-pole field to obtain 12 steps per revolution of the transmitted and of the repeater motor. It is well known that if instead of the two-pole armature, a four-pole armature is employed, it is possible to obtain twice the number of steps as in the case of a two-pole armature, that is to say, 24 steps per revolution of the transmitter and of the repeater motor. The principle underlying this feature is well known and is fully described, for example, in the English patent to Creffield, #8,346 of 1908.

Meitner in the said patent disclosed a new feature of operation where, by employing two transmitters and two repeater motors, the said transmitters being out of phase and the said repeater motors being geared together so that at certain points they operate in opposition to each other, it is possible to double the number of steps that can be obtained with one transmitter and with one repeater motor. The theory of such operation is fully set forth in the said Meitner patent where he obtains 24 steps by utilizing two-pole armatures and would obtain theoretically 48 steps if he utilized four-pole armatures in the repeater motors.

It has been found, however, that in the said Meitner device, under certain conditions, as where the repeater motors have any appreciable load placed thereon, one does not obtain the theoretical number of steps. The reason for this may be set forth as follows:

In the normal operation of a repeater motor of the type shown by Meitner, there is energized first one pair of poles, for example in Fig. 9 the poles 81, which gives the first step of the armature. For the next step two pairs of poles are energized, that is, 81 and 83, the armature taking up a theoretical mid-position. For the third step the field poles 83 alone are energized. It has been found that those positions which depend upon the energization of two pairs of poles result in an indefinite position of the armature to such an extent that where there is any load upon the armature this step will not be definite. This is all the more true where two repeater motors are geared together so that in certain positions they operate in opposition to each other. Thus, in Meitner, see Fig. 11, there occur positions such as position D, wherein two pairs of poles in each motor, that is, the poles energized by contacts 63—67 and 64—68 in one motor, and poles energized by contacts 63'—67' and 65'—69' in the other motor are energized at the same time to give a step of each repeater motor. If, as has been stated before, the energization of two pairs of poles in a repeater motor results in an indefinite step of the armature in said motor, it will readily be appreciated that the result of two motors in opposition, each of which has two pairs of poles energized so that the armature in each motor is in an indefinite position, will be a highly indefinite position of the common actuated member geared to said armatures. In other words, if there is any load at all upon the armatures, position D will never be realized, but instead the motor will probably jump from position C to position E.

It will further be seen that positions A, C and E of the Meitner patent each have the situation of two pairs of poles of one motor and a single pair of poles of the other motor energized. This results in a fairly definite position, the single pair of poles of one motor serving to counteract the indefiniteness of the motor having the two pairs of poles energized, and the result will be a fairly definite step even when there is considerable load on the armature. The ideal position where two repeater motors operate in opposition to each other is position B in said Meitner Fig. 11, wherein but a single pair of poles in each motor is energized.

The above discussion leads naturally to a statement of the objects of this invention, which are, in effect, to eliminate the D positions in Meitner, that is, to obviate the situation where two pairs of poles in each motor are energized at the same time to cause the two opposing armatures to be indefinitely located; and the corollary of this proposition is to provide as many B positions as possible, and, in any case, no position less definite than the A or C positions.

A further object of this invention is to provide a more accurate, more easily constructed, more durable transmitter than those heretofore in use in such transmission devices as shown, for example, by Meitner. For this purpose there may be employed a commutator type of transmitter in place of the cam and spring contact type of Fig. 9 of Meitner.

A further object of this invention is to provide a series of transmitters and a plurality of repeater instruments controlled thereby with means for shifting the control of the repeater instruments from one set of transmitters to another without the possibility of any serious disturbance in the position of the armatures of the repeater instruments which might cause loss of synchronism when the new control station is thrown on.

A further object of this invention is the provision of a transmitter controlling a repeater instrument wherein the circuits may be made by contact members engaging a commutator, in combination with means for so adjusting the position of the contacts relative to said commutator to control the sequence and duration of energization of the repeater instrument poles.

Still other objects and advantages of this invention will be pointed out or will become apparent as the detailed description of the invention proceeds.

In the accompanying drawings

Figure 1:
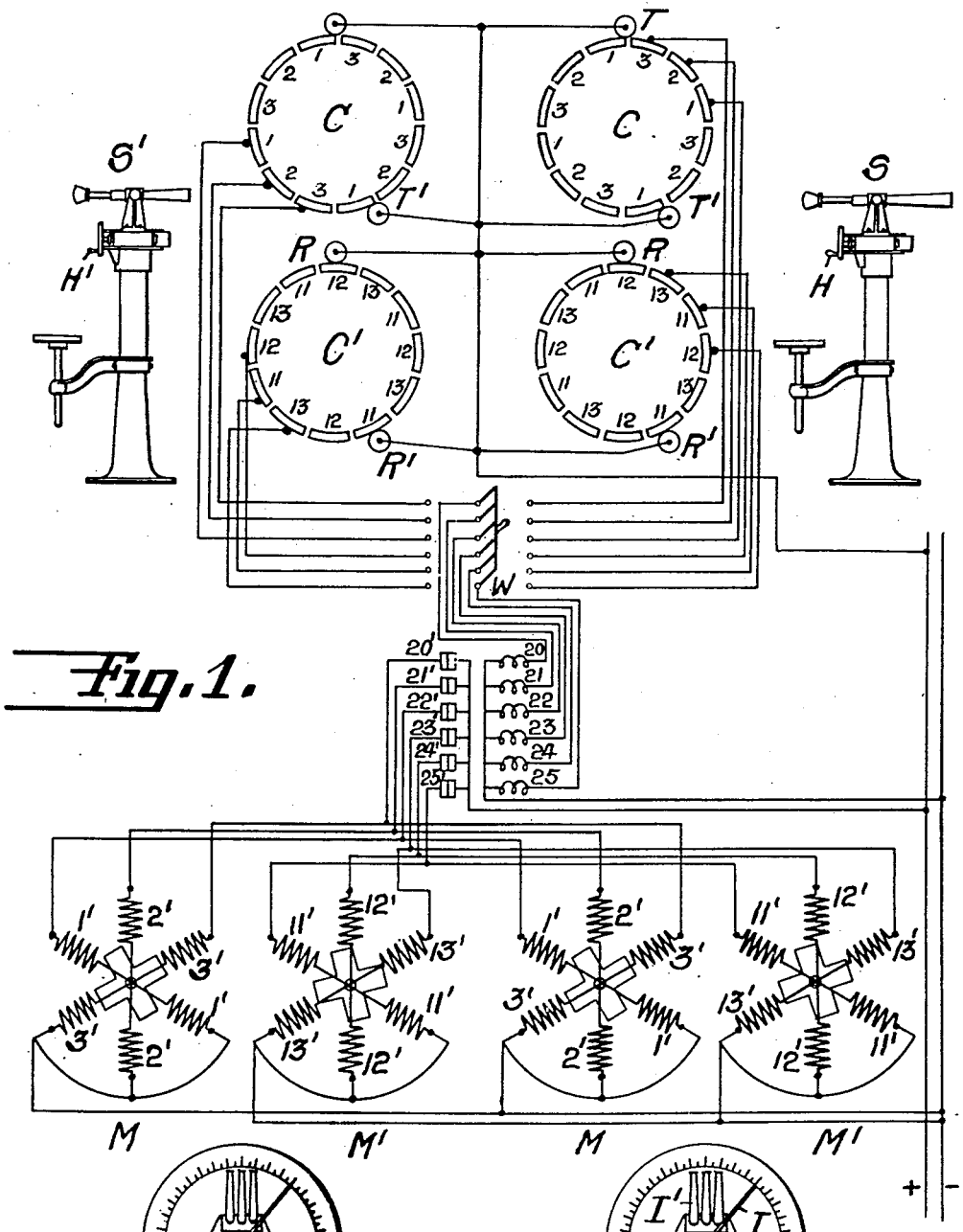
Fig. 1 is a view, largely diagrammatic, showing an assembly of a transmission system involving one form of our invention.

Referring to Fig. 1 of the drawings, which discloses an assembly view of a transmission system adapted to be utilized in a fire control system, there are shown two instruments S—S', which in this case are the control stations and which may be the sighting instruments for locating a target upon which a gun is to be trained. In operating the handles H—H' of said instruments, there is adapted to be rotated two controller commutators C—C' with respect to their pairs of trolleys T—T' and R—R'. Each commutator may comprise four series of contacts 1, 2, 3 and 11, 12, 13 respectively, separated by insulated segments, the said contacts controlling the field coils of the repeater motors bearing the same numerals as the contact segments with a prime added. In the following explanation it is assumed that the right hand control station is operating to cause operation of the repeater motors M—M', which means that the switch W has been thrown to the right to close said circuit. If the trolleys T—T' for example were exactly at opposite ends of a diameter, then only a single pair of coils of motor M could be energized at one time, that is, when the trolleys were on contacts 1, field coils 1' would be energized, and both trolleys would move simultaneously to contacts 2 to deenergize field coils 1' and energize field coils 2'. In order to get intermediate steps, however, it is necessary to energize at certain times two pairs of coils in order to give the armature an intermediate position. For this purpose, Meitner in the said Patent #1,391,652 so positions his cams 60—61—62 that first contacts 63—67 are closed, then both sets of contacts 63—67 and 64—68 are closed, and third contacts 64—68 alone are closed. Applicant performs the same operation more accurately by merely shifting the trolleys T—T' in a linear direction so that instead of standing at opposite ends of a diameter, that is, instead of subtending an angle of 180°, they subtend a smaller angle. It will, therefore, be understood that taking each motor M—M' separately, the coils are energized in the following sequence: 1', 1' and 2', 2', 2' and 3', 3', 3' and 1', and that this corresponds to six steps of the motor or 90°. A transmitter is, therefore, provided for performing this sequence of energization four times for accomplishing a complete revolution of the armature of a single motor. While a transmitter of any number of contact segments may be employed for effecting this sequence of energization of the field coils, we have shown a transmitter employing 12 contacts so that it includes, therefore, four sets of contacts 1, 2 and 3 corresponding to the coils 1', 2', 3' of the motor. Disregarding for the moment the size of the insulation each contact segment of the transmitter C would be 30°. The trolleys are so arranged that trolley T is just leaving contact segment 1, for example, when trolley T' is just entering upon another contact segment 1 at the opposite side of the commutator, so that the total energization of contact 1 would continue for 60°. In the hereinbefore described sequence of energization of the motor coils, it will be seen that each coil 1′, 2′, 3′ is energized continuously in each sequence for 45°. If, therefore, the insulation is made 7½° in width then each contact segment will be 22½° and, therefore, the total energization of 45° will be obtained in the course of the two trolleys T—T′ riding successively over the contact segments connected to the same coil.

In order to obtain the sequence noted above, that is, 1, 1—2, 2, etc., it will be noted that trolleys T—T′ have been displaced so that one trolley T is just leaving contact segment 1 when trolley T′ is just entering upon another contact segment 1, and if the insulation is 7½° then the total continuous energization of each coil will take place for 45°, as hereinbefore described. If, however, the insulation were not 7½°, but some smaller value, as for example 5°, then we cause the trolleys T and T′ to overlap on similar contact segments for a distance, in this case 2½°. That is to say, instead of trolley T′ just engaging a contact segment 1 when trolley T is just leaving a segment 1, trolley T′ would engage its segment 12½° before trolley T left its segment 1, so that for 2½° both trolleys T would be upon a segment 1. In this manner the total continuous energization of coils 1 for 45° would be effected. For accomplishing such overlapping, where necessary, (in this case the insulation has been shown as equal to 7½° and no overlapping for this purpose is here necessary) we shift the trolleys T—T′ again linearly in the proper direction to vary the angle between the trolleys and the center of the commutator by the predetermined amount.

The structure hereinbefore described, which permits shifting the trolleys of the commutator linearly with respect thereto, serves thus two purposes: First, the proper sequence of energization of the motor coils is obtained, and second, the duration of energization of said coils may be predetermined.

If one repeater motor M were employed with the single transmitter C, the motor M employing a four-pole armature, there would be obtained 24 steps as well known in the art and explained in the said Meitner and Greffield patents. Also, as explained in the said Meitner patent, the gearing together with the two repeater motors actuated by two transmitters, such as C—C′ out-of-phase with one another, will result in doubling the number of steps, that is, in providing 48 steps per revolution instead of 24. Applicant, however, seeks to avoid the indefinite steps of Meitner, or more correctly seeks to avoid the possibility of getting a smaller number of steps than the theoretical number by obviating the D positions of Fig. 11 of Meitner and increasing the B positions. To obtain this result, applicant shifts his controller C′ 15° or two steps out of phase with transmitter C and cuts down the period of continuous energization of each of the field coils 1′, 2′, 3′ of each motor from 45° to 37½°. The latter step is accomplished, as hereinbefore described by merely shifting the trolleys T, T′ linearly to cause overlapping on similar contacts for 7½°. Referring now to the development of Fig. 3, which shows the sequence in which the field poles of the motors are energized and the length of time that the trolleys engage the segments of the transmitters, it will be seen that the outer three rows of contacts bearing the numbers 1, 2, 3 correspond to the 12 contacts of the transmitter C. The inner three rows of contacts bearing the numbers 11, 12, 13 are the 12 contacts of controller C′.

Figure 3:
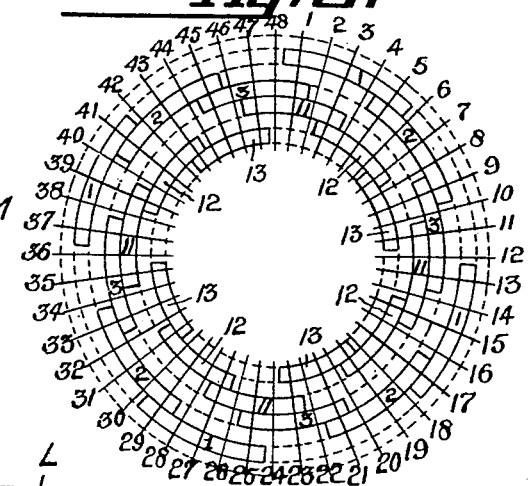
Fig. 3 is a development of the transmission system for showing the sequence of energization of the various field poles of the repeater instruments.

A close inspection of the said Fig. 3 will show first, as hereinbefore explained, that in each motor there is never more than two pairs of poles energized at one time. Thus it will be seen 1 and 2 overlap, 2 and 3 overlap, 3 and 1 overlap, but that at no time can there be energization of more than two pairs of poles of each motor. Similarly, 11 and 12 overlap, 12 and 13 overlap, and 13 and 11 overlap. The problem is to avoid closing the circuits through two pairs of poles of each motor simultaneously. This is to say, in Fig. 3 the overlapping portions representing energization of two pairs of poles of motor M must at no time occur simultaneously with overlapping portions indicating energization of two pairs of poles of motor M′ at the same time in any of the 48 steps. This is accomplished as hereinbefore described by shifting transmitter C′ 15° with respect to transmitter C and by shortening the period of continuous energization of the motor field coils from 45° to 37½°, so that wherever 11 and 12 overlap, said overlapping portion terminates one step in advance of overlapping portions 2 and 3 and does not begin until one step after overlapping portion 1 and 2 terminates. By this means it is impossible for the overlapping portions, that is to say, the time when two pairs of poles of one motor are energized, to occur at the same time as the overlapping portions of the other transmitter corresponding to energization of two pairs of poles of the other motor. Furthermore, it will be seen that there is thus obtained between each overlapping portion of one transmitter and the overlapping portion of the other transmitter a step corresponding to Meitner's step B, that is, where only one contact of each transmitter and hence only one pair of poles of each repeater motor is energized, which is highly desirable, for, as hereinbefore explained, the most definite step is the B step in Fig. 11 of Meitner's device. By reading Fig. 3 it will be observed that no less than 24 such steps are obtained in a revolution and that the remaining 24 steps consist of one overlapping portion and one single contact portion corresponding to one motor having two pairs of field poles and the other motor one pair of field poles energized, which also gives a definite, accurate step even when there is considerable load.

Figure 2:
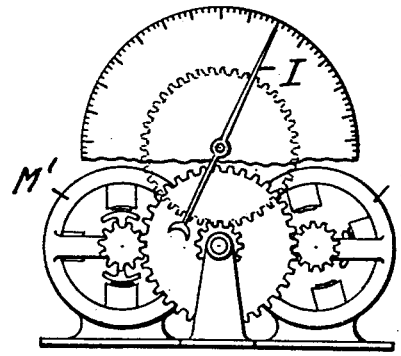
Fig. 2 is an indicating device controlled by the repeating instruments.

The instrument whereby the two repeater motors may be geared to a single actuating member is shown in Fig. 2 and is similar to that disclosed by Meitner in his Fig. 8, with the explanation that the repeater motors show four-pole armatures instead of two-pole armatures. The indicator I will be actuated at each of the 48 steps of the motors M, M'. The said pointer I may be one indicating member of a target turret indicator as disclosed in Fig. 1, the other indicator I' being actuated from the gun so that when the two pointers coincide, the gun is pointing in the proper position indicated by the sighting instrument to hit the target.

There is frequently provided in repeater systems, especially those used in gun fire control apparatus, a plurality of control stations, here indicated by the sighting instruments S—S', and it is frequently desirable to shift from one control station to the other. For this purpose switch W may be thrown in the other direction and the motor M—M', or as shown the sets of motors M—M', may be controlled from the other control station. In between the time of shifting from one station to the other or in the interval that neither control station is operating, that is, with the switch in open position as shown in Fig. 1, it has been found that the armatures of the repeater motors tend to become scattered and lose synchronism, which is frequently not regained when the control station is thrown in. To obviate the possibility of desynchronization, there is provided a locking or braking mechanism in the form of a plurality of coils, here numbered 20 to 25 inclusive, in circuit with the field coils 1, 2, 3, 11, 12 and 13 respectively, adapted to open sets of contacts 20' to 25' inclusive when the switch W is closed. Normally however, the contacts 20' to 25' are spring-pressed into closed position so that whenever the switch W is open, these contacts are closed and thus cause all of the field coils of the motors to be energized from the main supply lines, which thus effectively prevents movement of the armature and acts as an electro-magnetic brake. When a new control station is to be thrown in, the indication of the new controller may be brought to coincide with the indication of the repeating instrument and then the switch may be thrown to bring the controller into effective operating relation to the repeater motors, thus energizing electromagnets 20 to 25 inclusive to open the contacts 20 to 25 inclusive and thereafter render control of the energization of the repeater motor field coils subject to the closing of the circuits by transmitters C and C'.

Ordinarily, however, it will be understood that the field coils are directly connected to the segments of the transmitter commutators, which means that there is a great load on the transmitter commutators and that high current must be used resulting in sparking, and early destruction of the commutator rings and trolleys. By interposing the said locking and braking system, there need be employed only enough current to energize the electromagnets 20 to 25 inclusive and this, as is well known, requires but little current because the coils are of high resistance and, therefore, very little load is placed on the transmitter commutators and trolleys, which greatly lengthens the operative life of said transmitters. Further, it enables the entire motor circuit to be placed behind armor and only the circuit from the electro-magnets to the transmitters need be exposed. Heretofore the main circuit extended from the transmitters to the repeaters and could not be placed entirely behind safe armor.

Figure 4:
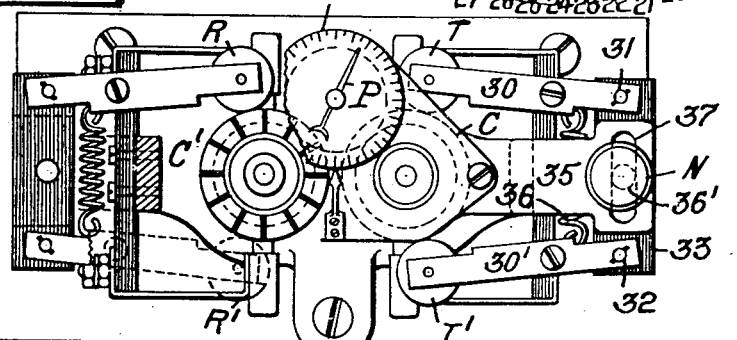
Fig. 4 is a plan view, with parts broken away, of a novel form of adjustable transmitter.
Figure 5:
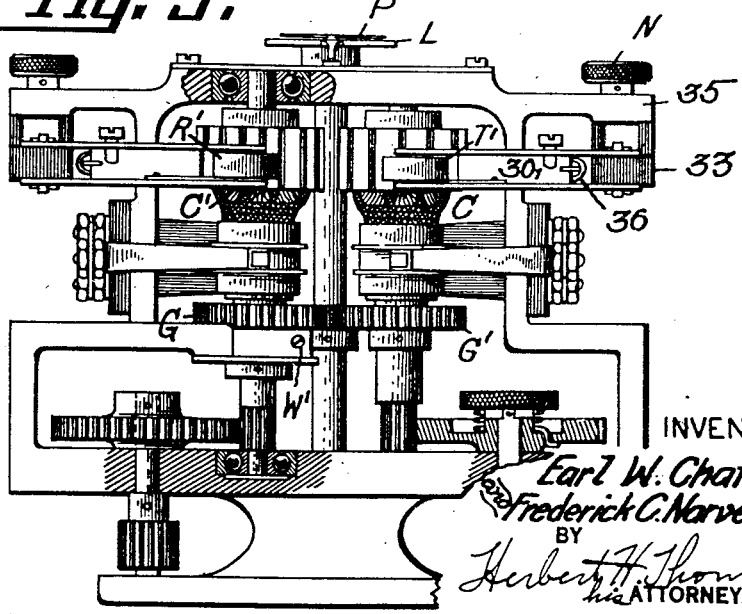
Fig. 5 is a front elevation, with parts broken away and partly sectioned, of the Fig. 4 device.

Referring now to Figs. 4 and 5, there is disclosed a form of transmitter providing for adjustability of the positions of the trolleys relative to the commutators to give the necessary angular relationship between the trolleys and the center of the commutator, as hereinbefore explained. In said Fig. 4 will be recognized the commutators C—C', the trolleys T—T', R—R' in engagement with said commutators, the gearing G—G' between said commutators leading to the indicator I. For permitting adjustability of the trolleys relative to the commutators, each pair of trolleys may be mounted upon an arm 30—30', said arms being pivotally mounted at 31—32 upon a bracket 33, which is movably mounted in a support 35. The two arms 30—30' may be joined by a spring 36 for maintaining the trolleys firmly in engagement with the commutator. An adjusting nut N may carry a pin 36 positioned eccentrically with respect to said nut and extending downwardly into a slot 37 formed in the block 33 so that by rotating nut N linearly with respect to the commutator, block 33 is moved toward or away from the commutator to move the trolleys and thus increase or decrease the angular relation between the trolleys and the center of the commutator. The adjusting mechanism is duplicated at the other side for the other set of trolleys R, R'.

The next step consists in displacing the commutators C, C' with respect to each other the predetermined amount (in this case, two steps or 15°, as shown in Fig. 1). This is accomplished by setting mechanism which may include a set-screw W' which, when loosened, permits free rotation of one commutator (in this case C') with respect to the gearing G, G', and hence with respect to the other commutator C.

A pointer P may operate over a scale L having 48 divisions in order to facilitate the setting of the brushes and commutators hereinbefore described.

It will be understood that the invention is capable of a more general application and that we have described above but one specific embodiment thereof. The invention may be stated more generally as follows: A system wherein repeater motors are geared together so that when working in opposition to each other they will actuate a common member through a plurality of steps and that in any given step not more than one motor is so energized that its armature is in a relatively indefinite position while the other motor is so energized that its armature is in a definite position resulting in a definite step of the common actuated member. This, of course, includes such energization of both motors that both armatures are in definite positions which will, of course, result in a definite step of the common actuated member. Broadly, therefore, our invention applies to other types of step-by-step repeater motors than that described herein, and in fact applies to any type of repeater motor wherein the armature may be positioned in definite and indefinite positions. For example, it applies equally well to the so-called three-wire, six-pole repeater motor wherein adjacent pairs of poles, such as 1—1 and 2—2 have full strength current through them for one step, the next step being full current through 1—1 and half current through 2—2 and 3—3, while the third step is full current through 1—1 and 3—3, etc. Here too we get definite and indefinite steps and when such motors are geared together in opposition to each other, they are energized and relatively positioned as we have hereinbefore described so that two indefinite positions of said motors never occur together.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In an electrical transmission system, a pair of repeater motors, each having a plurality of sets of field coils, said motors having armatures geared together, a transmitter for each of said motors capable of energizing alternately one pair and two pairs of field coils, said transmitters being positioned out-of-phase to such extent that when two pairs of field coils of one motor are energized not more than one pair of field coils of the other motor is energized.

2. In an electrical transmission system, a pair of repeater motors, each having a plurality of sets of field coils, said motors having armatures geared together, a transmitter for each of said motors capable of energizing alternately one pair and two pairs of field coils, said transmitters being positioned out-of-phase to such extent that one step intervenes between each energization of two pairs of field coils of one motor and two pairs of field coils of the other motor.

3. In an electrical transmission system, a pair of repeater motors, each having a plurality of sets of field coils, said motors having armatures geared together, a transmitter for each of said motors capable of energizing alternately one pair and two pairs of field coils, said transmitters being positioned out-of-phase to such extent that only one pair of field coils of each motor is energized at every other step.

4. In an electrical transmission system, a pair of repeater motors, each having a plurality of sets of field coils, said motors having armatures geared together, a transmitter for each of said motors capable of energizing alternately one pair and two pairs of field coils, said transmitters being positioned out-of-phase to such extent that only one pair of field coils of each motor is energized at every other step, and on intermediate steps one pair of field coils of one motor and two pairs of field coils of the other motor are energized.

5. In an electrical transmission system, a pair of repeater motors, each having a plurality of sets of field coils, said motors having armatures geared together, a transmitter for each of said motors capable of energizing alternately one pair and two pairs of field coils, said transmitters being positioned out-of-phase to such extent that four-step cycles are obtained as follows: first, one pair of field coils of each motor is energized, second, one pair of field coils of one motor and two pairs of field coils of the second motor are energized, third, one pair of field coils of each motor is energized, fourth, two pairs of field coils of the first motor and one pair of field coils of the second motor are energized.

6. In an electrical transmission system, a pair of repeater motors, each having three pairs of field coils, said motors having four-pole armatures geared together, and a transmitter for each of said motors capable of energizing alternately one pair and two pairs of said field coils, said transmitters being positioned out of phase to such extent that when two pairs of field coils of one motor are energized not more than one pair of field coils of the other motor is energized.

7. In an electrical transmission system, a pair of repeater motors, each having three pairs of field coils, said motors having four-pole armatures geared together, and a transmitter for each of said motors capable of energizing alternately one pair and two pairs of said field coils, said transmitters being positioned out of phase to such extent that on every other step one pair of field coils of one motor and two pairs of field coils of the other motor are energized.

8. In an electrical transmission system, a pair of repeater motors, each having three pairs of field coils, said motors having four-pole armatures geared together, and a transmitter for each of said motors capable of energizing alternately one pair and two pairs of said field coils, said transmitters being positioned out of phase to such extent that on every other step one pair of field coils of one motor and two pairs of field coils of the other motor are energized, and on intermediate steps only one pair of field coils of each motor is energized.

9. In an electrical transmission system, a pair of repeater motors, each having three pairs of field coils, said motors having four-pole armatures geared together, and a transmitter for each of said motors capable of energizing alternately one pair and two pairs of said field coils, said transmitters being positioned out of phase to such extent that a plurality of four-step cycles are obtained, each cycle comprising the following steps: first, one pair of field coils of each motor is energized, second, one pair of field coils of one motor and two pairs of field coils of the second motor are energized, third, one pair of field coils of each motor is energized, fourth, two pairs of field coils of the first motor and one pair of field coils of the second motor are energized.

10. In an electrical transmission system, a pair of repeater motor, each having three pairs of field coils, said motors having four-pole armatures geared together, and a transmitter for each of said motors capable of energizing alternately one pair and two pairs of said field coils, said transmitters being positioned out of phase to such extent that twelve four-step cycles are obtained in each revolution of said transmitters, each cycle comprising the following steps: first, one pair of field coils of each motor is energized, second, one pair of field coils of one motor and two pairs of field coils of the second motor are energized, third, one pair of field coils of each motor is energized, fourth, two pairs of field coils of the first motor and one pair of field coils of the second motor are energized.

11. In an electrical transmission system, a pair of repeater motors, each having three pairs of field coils, said motors having four-pole armatures geared together, and a transmitter for each of said motors capable of energizing alternately one pair and two pairs of said field coils, said transmitters being positioned out of phase to such extent that at every second step one pair of field coils of each motor is energized.

12. In an electrical transmission system, a repeater motor having a plurality of pairs of field coils and a transmitter comprising a commutator having a plurality of segments in circuit with said coils, and a pair of trolleys engaging said segments to close the circuit through said coils, the angular relation between said trolleys and the center of said commutator being such that alternately one pair and two pairs of field coils are energized.

13. In an electrical transmission system, a repeater motor having a plurality of field coils and a transmitter comprising a commutator having a plurality of segments in circuit with said coils, and a pair of trolleys engaging said segments to close the circuit through said coils, the angular relation between said trolleys and the center of said commutator determining the sequence and duration of energization of said field coils.

14. In an electrical transmission system, a repeater motor having a plurality of field coils and a transmitter comprising a commutator having a plurality of segments in circuit with said coils, a pair of trolleys engaging said segments to close the circuit through said coils, the angular relation between said trolleys and the center of said commutator determinig the sequence and duration of energization of said field coils, and means whereby said angularity may be varied.

15. In an electrical transmission system, a repeater motor having a plurality of field coils and a transmitter comprising a commutator having a plurality of segments in circuit with said coils, a pair of trolleys engaging said segments to close the circuit through said coils, the angular relation between said trolleys and the center of said commutator determining the sequence and duration of energization of said field coils, and means whereby said angularity may be varied, said last-named means comprising means for moving said trolleys linearly with respect to said commutator.

16. In an electrical transmission system, a repeater motor having a plurality of field coils and a transmitter comprising a commutator having a plurality of segments in circuit with said coils, a pair of trolleys engaging said segments to close the circuit through said coils, the angular relation between said trolleys and the center of said commutator determining the sequence and duration of energization of said field coils, and means whereby said angularity may be varied, said last-named means comprising means for moving said trolleys toward or away from opposite ends of a diameter of said commutator.

17. In an electrical transmission system, a repeater motor having a plurality of field coils and a transmitter comprising a commutator having a plurality of segments in circuit with said coils, a pair of trolleys engaging said segments to close the circuit through said coils, the angular relation between said trolleys and the center of said commutator determining the sequence and duration of energization of said field coils, and means whereby said angularity may be varied, said last-named means comprising a member carrying said trolleys, means normally pressing said trolleys into engagement with said commutator, and means whereby said member may be moved toward or away from said commutator.

18. In an electrical transmission system, a plurality of control stations, a plurality of repeater motors, means for shifting control of said motors from one control station to another control station, and means for locking the armatures of said motors in position while shifting control.

19. In an electrical transmission system, a plurality of control stations, a plurality of repeater motors each having a plurality of field coils and an armature, means for shifting control of said motors from one control station to another control station, and means for locking the armatures of said motors in position while shifting control, said last-named means including means for energizing all of said coils during said shifting interval.

20. In an electrical transmission system, a plurality of control stations, a plurality of repeater motors each having a plurality of field coils and an armature, means for shifting control of said motors from one control station to another control station, and means for locking the armatures of said motors in position while shifting control, said last-named means including means for normally energizing all of said coils, and means at said control stations for selectively deenergizing one or more of said coils.

21. In an electrical transmission system, a plurality of control stations, a plurality of repeater motors each having a plurality of field coils and an armature, means for shifting control of said motors from one control station to another control station, and means for locking the armatures of said motors in position while shifting control, said last-named means including means for normally energizing all of said coils, and means at said control stations for selectively deenergizing one or more of said coils, said last-named means including a pair of contacts in the circuit of each coil, an electro-magnet controlling each pair of contacts, and a circuit closer at the control station for energizing said electromagnets.

22. In an electrical transmission system, a plurality of control stations, a plurality of repeater motors each having a plurality of field coils and an armature, means for shifting control of said motors from one control station to another control station, and means for locking the armatures of said motors in position while shifting control, said last-named means including means for normally energizing all of said coils, and means at said control stations for selectively deenergizing one or more of said coils, said last-named means including a pair of contacts in the circuit of each coil, an electro-magnet controlling each pair of contacts, and a circuit closer at the control station for energizing said electro-magnets, said contacts, electro-magnets and circuit closers forming a circuit independent of the circuit for energizing said coils.

23. In an electrical transmission system, a plurality of control stations, a plurality of repeater motors each having a plurality of field coils and an armature, means for shifting control of said motors from one control station to another control station, and means for locking the armatures of said motors in position while shifting control, said last-named means including means for normally energizing all of said coils, means at said control stations for selectively deenergizing one or more of said coils, and a selective switch for operatively connecting said control stations to said coils.

24. In an electrical transmission system, a plurality of repeater motors each having a plurality of field coils, transmitters for controlling said motors, a heavy duty electric circuit for normally energizing all of said coils, and a light duty electric circuit including said transmitters, a pair of contacts for each coil and an electro-magnet for each pair of contacts adapted to be controlled by said transmitters for selectively deenergizing one or more of said coils.

25. In an electrical transmission system, a plurality of repeater motors each having a plurality of field coils, transmitters for controlling said motors, a heavy duty electric circuit for normally energizing all of said coils, and a light duty electric circuit for selectively deenergizing one or more of said coils, said last-named circuit including a pair of contacts for each coil, an electro-magnet for controlling each pair of contacts, said electro-magnets being adapted to be controlled by said transmitters, and a selective switch for operatively connecting said control stations to said coils.

26. In an electrical transmitter system, a plurality of control stations, a plurality of repeater motors each having a plurality of field coils and an armature, means for shifting control of said motors from one control station to another control station, and means for locking the armatures of said motors in position while shifting control, said means including a heavy duty electric circuit for normally energizing all of said coils, and a light duty electric circuit including means at said control station for selectively deenergizing one or more of said coils.

27. In an electrical transmission system, a plurality of control stations, a plurality of repeater motors each having a plurality of field coils and an armature, means for shifting control of said motors from one control station to another control station, and means for locking the armatures of said motors in position while shifting control, said means including a heavy duty electric circuit for normally energizing all of said coils, and a light duty electric circuit for selectively de-energizing one or more of said coils, said light duty circuit including a pair of contacts in the circuit of each coil, an electromagnet controlling each pair of contacts, a circuit closer at the control station for energizing said electro-magnets, and a selective switch for operatively connecting said control stations to said coils.

28. In an electrical transmission system, a pair of repeater motors each having a plurality of sets of field coils, said motors having armatures geared together, a member actuated through said gearing, a transmitter for each of said motors for selectively energizing said field coils so that said armatures assume more definite and less definite positions, and means whereby at each step of said member not more than one of said armatures is in one of said less definite positions.

29. In an electrical transmission system, a pair of repeater motors each having a plurality of sets of field coils, said motors having armatures geared together, a member actuated through said gearing, a transmitter for each of said motors for selectively energizing said field coils so that said armatures assume more definite and less definite positions, and means for so controlling the energization of said coils whereby at each step of said member not more than one of said armatures is in one of said less definite positions.

30. In an electrical transmission system, a pair of repeater motors each having a plurality of sets of field coils, said motors having armatures geared together, a member actuated through said gearing, a transmitter for each of said motors for selectively energizing said field coils so that said armatures assume more definite and less definite positions, and means for so controlling the energization of said coils whereby at each step of said member not more than one of said armatures is in one of said less definite positions, such step being followed by a step wherein the armatures of both motors are in one of said more definite positions.

31. In an electrical transmission system, a pair of repeater motors each having a plurality of sets of field coils, said motors having armatures geared together, a member actuated through said gearing, a transmitter for each of said motors for selectively energizing said field coils so that said armatures assume more definite and less definite positions, and means for so controlling the energization of said coils whereby at each step of said member not more than one of said armatures is in one of said less definite positions, said step alternating with a step wherein the armatures of both motors are in said more definite positions.

32. In an electrical transmission system, a pair of repeater motors each having an armature, a common member actuated by said armatures, means whereby each of said motors may be energized to provide more definite and less definite positions for its armature, and means whereby at each step of said member not more than one of said armatures is in one of said less definite positions.

In testimony whereof we have affixed our signatures.

EARL W. CHAFEE.
FREDERICK C. NARVESEN.